United States Patent
Leoutsarakos (10) Patent No.: US 7,849,305 B2
(45) Date of Patent: Dec. 7, 2010

(54) METHOD AND APPARATUS FOR SHARING DATA BETWEEN A SERVER AND A PLURALITY OF CLIENTS

(75) Inventor: Nicholaos I. Leoutsarakos, Brossard (CA)

(73) Assignee: Axxian Technologies, Inc., Brossard, Quebec (CA)

( * ) Notice: Subject to any disclaimer, the term of this patent is extended or adjusted under 35 U.S.C. 154(b) by 1405 days.

(21) Appl. No.: 10/227,351

(22) Filed: Aug. 26, 2002

(65) Prior Publication Data

US 2004/0039905 A1    Feb. 26, 2004

(51) Int. Cl.
*H04L 29/06* (2006.01)
(52) U.S. Cl. .................... 713/153; 709/209
(58) Field of Classification Search .............. 709/229; 713/153
See application file for complete search history.

(56) References Cited

U.S. PATENT DOCUMENTS

| | | | |
|---|---|---|---|
| 5,253,165 A | 10/1993 | Leiseca et al. | |
| 5,272,474 A | 12/1993 | Hilliard | |
| 5,363,447 A * | 11/1994 | Rager et al. | 380/273 |
| 5,432,508 A | 7/1995 | Jackson | |
| 5,648,906 A * | 7/1997 | Amirpanahi | 705/418 |
| 5,708,780 A * | 1/1998 | Levergood et al. | 709/229 |
| 5,710,557 A | 1/1998 | Schuette | |
| 5,748,107 A | 5/1998 | Kersken et al. | |
| 5,797,126 A | 8/1998 | Helbling et al. | |
| 5,877,704 A | 3/1999 | Yoshida | |
| 5,910,782 A | 6/1999 | Schmitt et al. | |
| 5,940,481 A | 8/1999 | Zeitman | |
| 6,147,624 A | 11/2000 | Clapper | |
| 6,148,253 A | 11/2000 | Taguchi et al. | |
| 6,182,171 B1 | 1/2001 | Akatsuka et al. | |
| 6,209,026 B1 | 3/2001 | Ran et al. | |
| 6,249,233 B1 | 6/2001 | Rosenburg et al. | |
| 6,285,297 B1 | 9/2001 | Ball | |
| 6,484,257 B1 * | 11/2002 | Ellis | 713/153 |
| 2002/0169842 A1 * | 11/2002 | Christensen et al. | 709/206 |
| 2003/0041093 A1 * | 2/2003 | Yamane et al. | 709/201 |
| 2004/0003287 A1 * | 1/2004 | Zissimopoulos et al. | 713/201 |

FOREIGN PATENT DOCUMENTS

| | | |
|---|---|---|
| JP | 02193841 | 7/1990 |
| JP | 03308443 | 10/1991 |
| JP | 04080899 | 3/1992 |
| JP | 05120599 | 5/1993 |
| WO | WO 02/11391 A2 * | 2/2002 |

OTHER PUBLICATIONS

Doyle, Jeff. "Dynamic Routing Protocols." Nov. 16, 2001. http://www.ciscopress.com/articles/article.asp?p=24090&seqNum=4 Accessed on Feb. 3, 2006.*

* cited by examiner

*Primary Examiner*—Kambiz Zand
*Assistant Examiner*—Jason K Gee
(74) *Attorney, Agent, or Firm*—Anglehart et al (57) ABSTRACT

A method and apparatus is disclosed for controlling the sharing of data in a network between a plurality of client units and a corporate server using a secure bridging unit. Each of the plurality of client units, the corporate server and the secure bridging unit are identified using an identifier. A client unit communicates with the corporate server using the secure bridging unit. A central management unit manages the plurality of client units, the corporate server and the secure bridging unit.

28 Claims, 9 Drawing Sheets

FIG. 1

FIG-5

METHOD AND APPARATUS FOR SHARING DATA BETWEEN A SERVER AND A PLURALITY OF CLIENTS

CROSS-REFERENCE TO RELATED APPLICATIONS

This is the first application filed for the present invention.

TECHNICAL FIELD

This invention pertains to the field of sharing data between a server and a plurality of clients. More precisely, this invention pertains to the field of managing the sharing of data between a server and a plurality of clients connected to a communication network.

BACKGROUND OF THE INVENTION

Sharing data in a communication network is an important application. It enables a plurality of client processing units to have access to data located on a remote server processing unit. With Wide Area Networks (WAN), such as the Internet, the remote server processing unit may be located thousands of miles away from the client processing units.

Unfortunately, serious security threats usually accompany the remote locating of data in a client/server architecture. Hackers take this opportunity to try to access data shared if no precautions are taken to ensure data security.

In order to ensure data security, authentication and encryption schemes have been developed. Such authentication/encryption schemes are usually based on cryptographic science. It may then be more and more difficult to have access to data shared between a client unit and a server unit. However, it will be appreciated by someone skilled in the art that it may be possible for a hacker to locate one of the plurality of client units or the corporate server by discovering and using its address in a Wide Area Network.

Meanwhile, it is well appreciated that Wide Area Networks have contributed to the development of numerous applications where data is shared between two parties with a third party supervising the two parties. At least one of the two parties may pay for the third party's supervising a fixed fee or a flexible fee for instance.

Unfortunately it may be very difficult for the third party to avoid that the two parties share data directly between them and thus the third party lose control of the sharing of data between the two parties.

There is a need for a method and apparatus which will overcome the above-mentioned drawbacks.

SUMMARY OF THE INVENTION

It is an object of the invention to provide a method and apparatus for managing the sharing of data between a server and a plurality of client units.

It is another object of the present invention to provide a method and apparatus for managing the sharing of data between a corporate server and a plurality of client units, the corporate server and the plurality of client units communicating anonymously.

According to a first aspect of the invention, there is provided a method for managing a sharing of data between a plurality of client units and a corporate server located on a network, the method comprising the steps of authenticating a client unit with a central management server, the authenticating comprising the providing of an identification of the client unit to the central management server, providing from the client unit to the central management server an identification of a corporate server to which the client unit wishes to communicate, providing from the central management server to the client unit an address on the network of the location of a suitable secure bridging unit using at least one of the identification of the client unit, providing a message to communicate to the suitable secure bridging unit from the client unit, said message comprising said identification of the corporate server to which said client unit wishes to communicate and data to provide to said corporate server and if said message to communicate with the suitable secure bridging unit is accepted by said secure bridging unit, transferring at least one part of said message to said corporate server, whereby the use of the corporate server and the secure bridging unit enables a control of the communication between the client unit and the corporate server.

According to another aspect of the invention, there is provided a method for managing a sharing of data between a plurality of parking lot units and a central computer of a party located on a network, the method comprising the steps of authenticating a parking lot unit with a central management server, the authenticating comprising the providing of an identification of the parking lot unit to the central management server, providing from the parking lot unit to the central management server an identification of a central computer to which the parking, lot unit wishes to communicate, providing from the central management server to the parking lot unit an address on the network of the location of a suitable secure bridging unit using at least one of the identification of the parking lot unit, providing a message to communicate to the suitable secure bridging unit from the parking lot unit, said message comprising said identification of the central computer to which said parking lot unit wishes to communicate and data to provide to said central computer and if said message to communicate with the suitable secure bridging unit is accepted by said secure bridging unit, transferring at least one part of said message to said central computer, whereby the use of the central computer and the secure bridging unit enables a control of the communication between the parking lot unit and the central computer.

According to another aspect of the invention, there is provided a system for managing sharing of data between a plurality of client units and a corporate server located on a network, the system comprising a plurality of client units, each client unit comprising a client unit identifier identifying said client unit, the client unit further comprising a corporate server identifying said corporate server to which said client unit intends to share said data, a corporate server and comprising a corporate server identifier, a central management server, located on said network, comprising a list of secure bridging unit identifier, the central management server further comprising an authentication module receiving an authentication request from a client unit for a corporate server and providing, in response, to said client unit, an address on said network of a suitable secure bridging unit according to said list of secure bridging unit identifier, at least one secure bridging unit comprising at least one relation between a client unit identifier and a corporate server identifier, the secure bridging unit further comprising an address on said network of said corporate server, the secure bridging unit receiving a communication request from a client unit and forwarding at least one part of said communication request to said corporate server, wherein data shared between said corporate server and said client unit are managed using the central management server in combination with the secure bridging unit.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION OF THE PREFERRED EMBODIMENT

Figure 1:
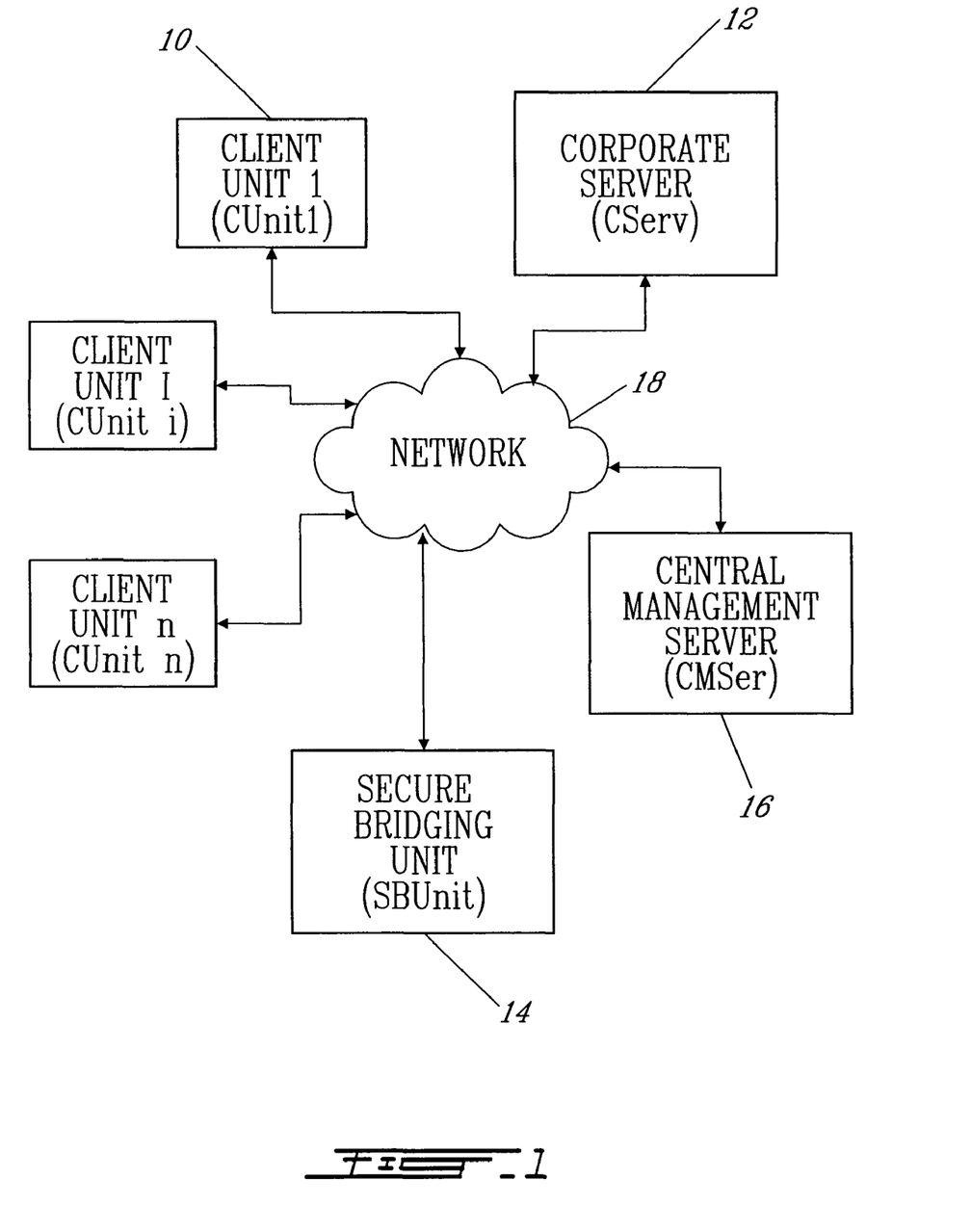
FIG. 1 a block diagram which shows a network to which is connected a plurality of client units, a corporate server, a central management server and a secure managing unit.

Now referring to FIG. 1, there is shown the preferred embodiment of the invention. In the preferred embodiment of the invention, a plurality of client units 10 are connected to a network 18. The plurality of client units wish to communicate with a corporate server 12, which is also connected to the network 18. A central management server 16 is connected to the network 18 and manages the system as explained below. A secure bridging unit 14, also connected to the network 18 is dedicated for at least forwarding data as explained below.

In the preferred embodiment of the invention, the network 18 may be any Wide Area Network such as the Internet for instance. The plurality of client units 10 as well as the corporate server 12 may be connected to the network using a wireless connection, or a wire connection, or any other type of connection. The client management server 16 as well as the secure bridging unit 14 may be connected to the network 18 using a wireless connection, or a wire connection, or any other type of connection.

In the preferred embodiment of the invention, a subset of the plurality of client units comprises at least one mobile client unit while another subset of the plurality of client units comprises at least one fixed client unit.

Figure 2:
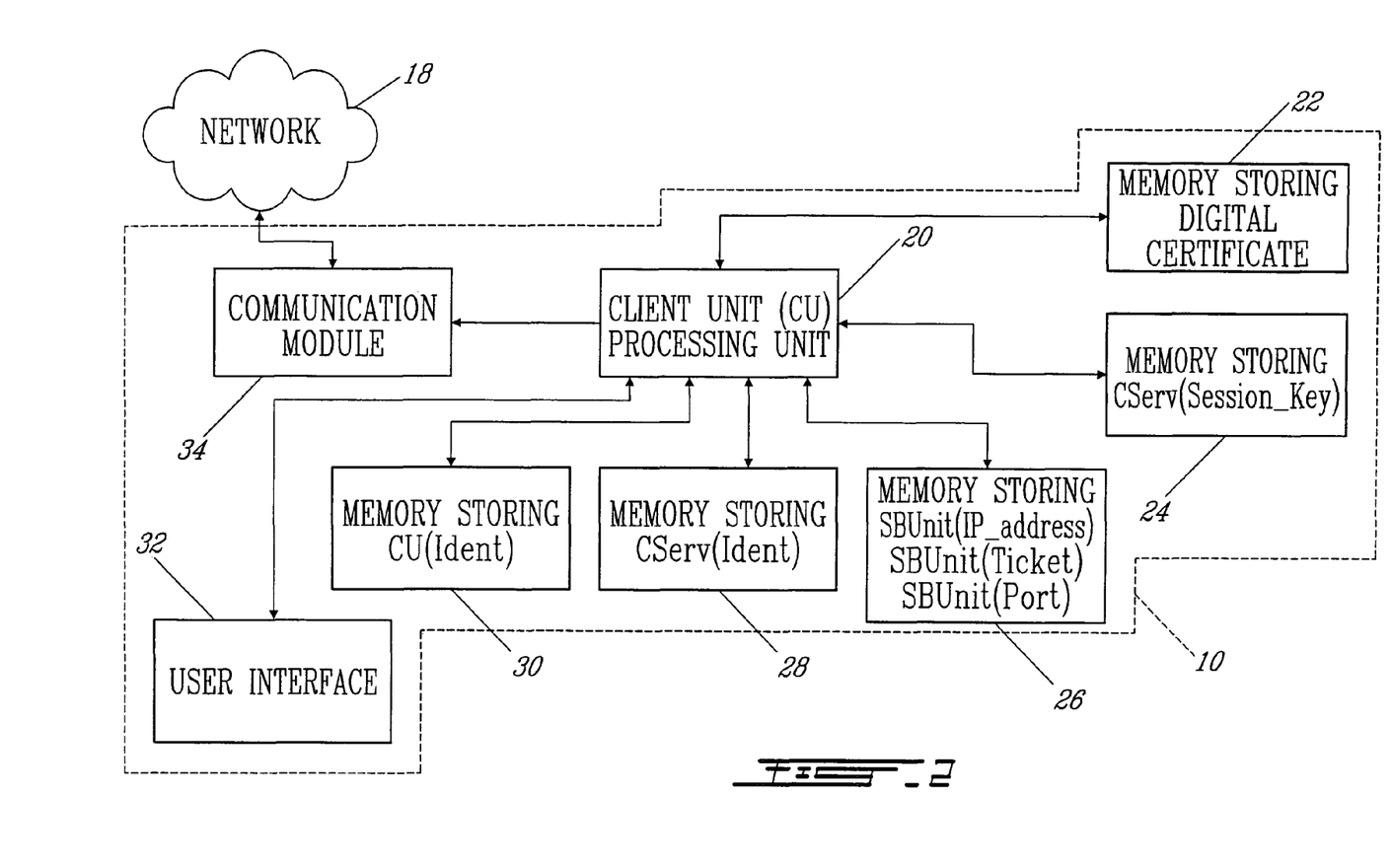
FIG. 2 is a block diagram which shows each components of a client unit.

Now referring to FIG. 2, there is shown a block diagram, which presents each component of a client unit. The client unit 10 comprises a client unit processing unit 20, a digital certificate storing memory 22, a memory 24 storing a corporate server session key, a memory 26 storing an Internet Protocol address, a port number and a ticket of a secure bridging unit to which the client unit may anonymously communicate, a memory 28 storing an identification of the corporate server to which the client wishes to communicate ultimately, a memory 30 storing an identification of the client unit, a user interface 32 and a communication module 34. It must be noted that the identification of the server and the identification of the clients are abstractions of actual connections to network 18.

As explained above, the client unit 10 may be a mobile client unit or a fixed wired client unit. In the case of a fixed client unit, the communication module 34 comprises a high-speed Internet connection module. In the case of a mobile client unit, the communication module 34 of the mobile client unit 10 comprises an IEEE802.11b communication interface or the like in the preferred embodiment of the invention.

The client processing unit 20 comprises a Central Processing Unit (CPU) having a clock speed of 500 MHz or faster in the case of a fixed client unit and in the preferred embodiment of the invention. In the case of the mobile client unit embodiment, the client unit processing unit 20 comprises a CPU having a clock speed of 200 MHz CPU or faster.

Still in the preferred embodiment of the invention, the digital certificate storing memory 22, the memory 24 storing a corporate server session key, the memory 26 storing an Internet Protocol address, a port number and a ticket of a secure bridging unit to which the client unit communicate, the memory 28 storing an identification of the corporate server to which the client wishes to communicate ultimately and the memory 30 storing an identification of the client unit are located advantageously in a volatile memory.

In the case of a fixed client unit 10, the size of the volatile memory is at least 128 Mb while in the case of a mobile client unit, the volatile memory is at least 64 Mb.

A user may provide data using the user interface 32. In the case of a fixed client unit, the user interface 32 comprises a built-in Barcode scanning unit, a built-in magnetic-stripe scanning unit and a built-in 15-inch touch screen.

In the case of a mobile client unit, the user interface 32 comprises a built-in Barcode scanning unit, a built-in magnetic-stripe scanning unit and a keyboard comprising four user-defined function keys in the preferred embodiment of the invention. Still in the preferred embodiment of the invention, and in the case of the fixed client unit, the operating system is Microsoft Windows 2000, while in the case of the mobile client unit, Microsoft Pocket PC 2002 is advantageously used as an operating system.

In the preferred embodiment of the invention, the digital certificate storing memory 22 comprises a digital certificate, which is shared among the plurality of client units. Such digital certificate is compatible with the Secure Socket Layer authentication standard. The digital certificate has a size of 1024 Bits.

Still a preferred embodiment of the invention, the memory 24 storing a corporate server session key comprises a session key, which is a 256 bit 3DES encryption key in the preferred embodiment. The memory 26 storing an Internet Protocol address, a port number and a ticket of a secure bridging unit to which the client unit communicates, comprises a secure bridging unit ticket, which is a 32 bit 3DES encryption key in the preferred embodiment of the invention.

Still in the preferred embodiment of the invention, the memory 28 storing an identification of the corporate server to which the client wishes to communicate ultimately and the memory 30 storing an identification of the client unit itself comprise a virtual multipurpose authentication number which has a size of 32 bits.

Figure 3:
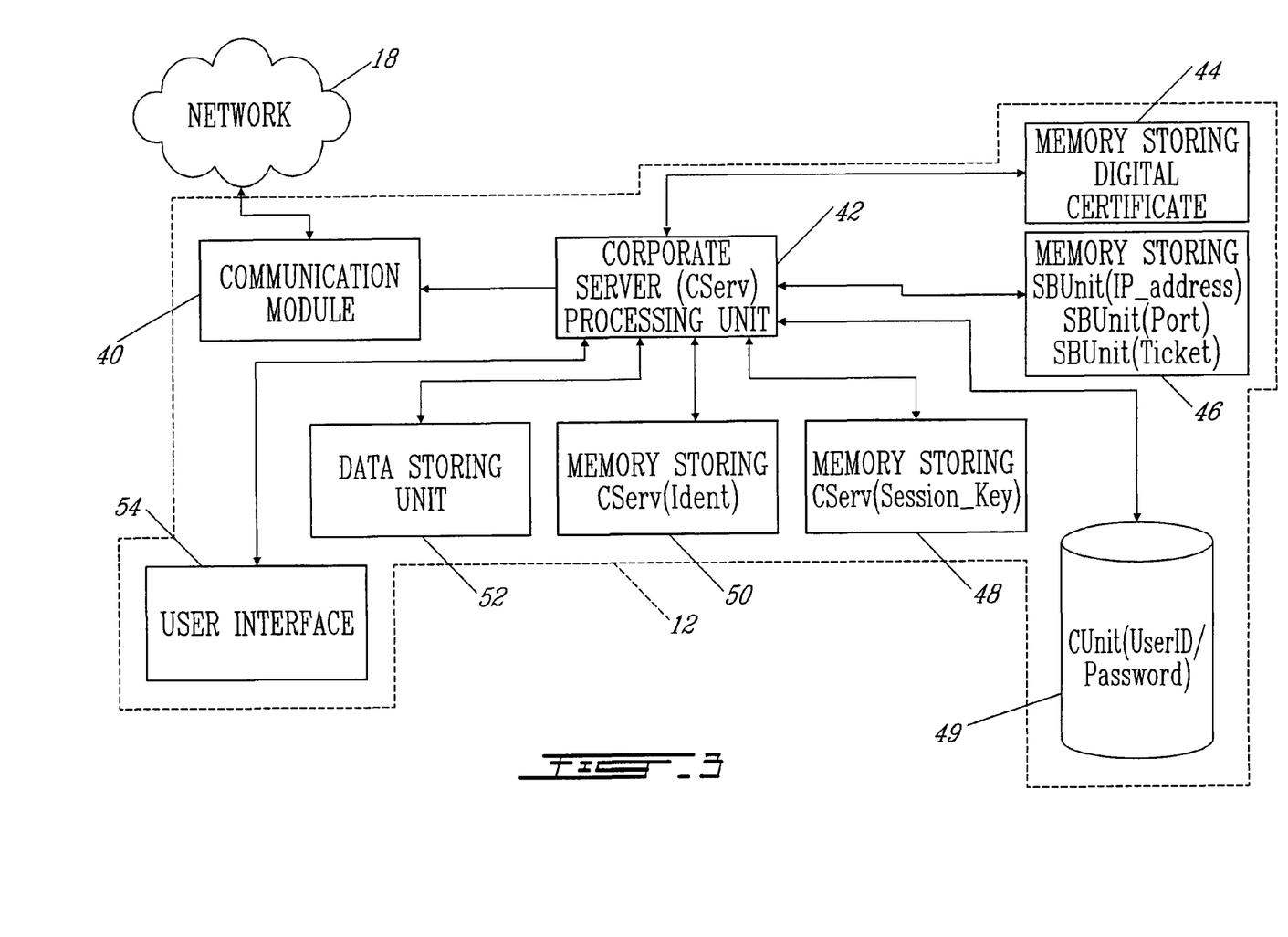
FIG. 3 is a block diagram which shows each components of the corporate server.

Now referring to FIG. 3, there is shown a block diagram, which presents each component of the corporate server 12.

The corporate server 12 comprises a communication module 40, a corporate server processing unit 42, a digital certificate storing memory 44, a memory 46 storing an Internet Protocol address, a port number and a ticket of a secure bridging unit to which the corporate server 12 communicates, a memory 48 storing a corporate server session key, a database 49 comprising userID and password of a plurality of client units, a memory 50 storing an identification of the corporate server, a data storing unit 52 and a user interface 54.

In the preferred embodiment of the invention, the corporate server processing unit 42 comprises a CPU having a speed of 1 GHz or faster. The corporate server 12 is connected to the network 18 using the communication module 40, which comprises, in the preferred embodiment of the invention, an Ethernet port having a speed of 100 Mb/sec.

Still in the preferred embodiment of the invention, the corporate server processing unit 42 operates under Microsoft Windows 2000.

The digital certificate storing memory 44, the memory 46 storing an Internet Protocol address, a port number and a ticket of a secure bridging unit to which the corporate server 12 communicates, the memory 48 storing a corporate server session key and the memory 50 storing an identification of the corporate server are advantageously located in a volatile memory. In the preferred embodiment of the invention, the size of the volatile memory is 512 Mb.

The corporate server 42 comprises a hard disc which is not shown on FIG. 3, and which has a size of 40 Gb in the preferred embodiment of the invention. The hard disc comprises at least the operating system and the application of the corporate server 12.

The user interface 54 comprises a keyboard and a mouse in the preferred embodiment of the invention.

Figure 4:
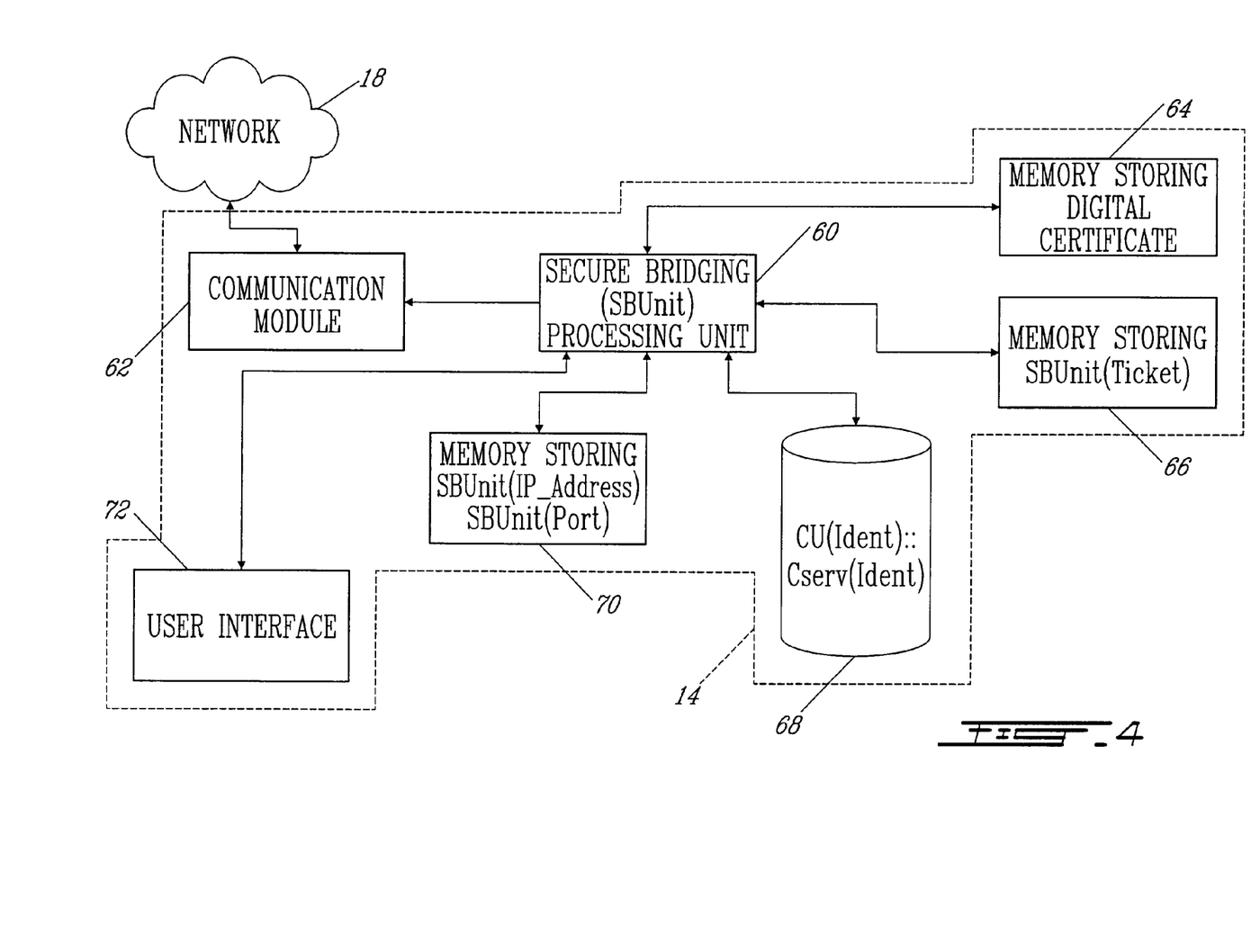
FIG. 4 is a block diagram which shows each components of the secure bridging unit.

Now referring to FIG. 4, there is shown a block diagram of each component of the secure bridging unit 14.

The secure bridging unit 14 comprises a communication module 62, a secure bridging processing unit 60, a digital certificate storing memory 64, a memory 66 storing a secure bridging unit ticket, a database 68 comprising a relation between an identification of a client unit and an identification of a corporate server, a memory 70 storing an Internet Protocol address and a port number of the secure bridging unit and a user interface 72.

In the preferred embodiment of the invention, the secure bridging processing unit 60 comprises a CPU having a speed of 1 GHz or faster. Still in the preferred embodiment of the invention, the secure bridging processing unit 60 operates under Microsoft Windows 2000. The digital certificate storing memory 64, the memory 66 storing a secure bridging unit ticket, the database 68 comprising a relation between an identification of a client unit and the memory 70 storing an Internet Protocol address and a port number of the secure bridging unit are advantageously located in a volatile memory. Still in the preferred embodiment of the invention, the volatile memory has a size of 512 Mb.

The secure bridging unit 14 is connected to the network 18 using the communication module 62 which comprises an Ethernet port of 100 Mb/sec in the preferred embodiment of the invention.

The user interface 72 comprises a 15 inches monitor, a keyboard and a mouse in the preferred embodiment of the invention.

Figure 5:
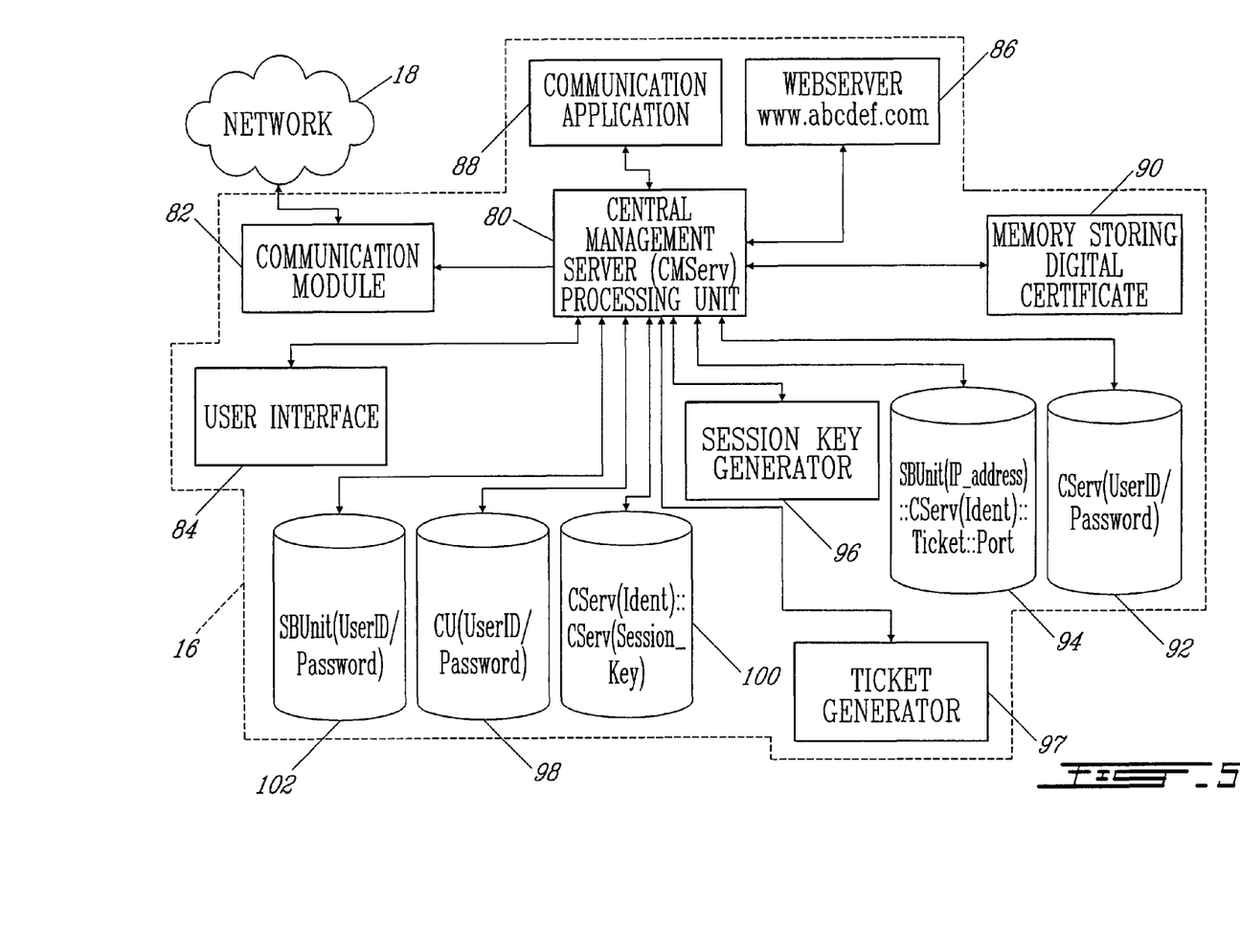
FIG. 5 is a block diagram which shows each components of the central management server.

Now referring to FIG. 5, there is shown a block diagram which shows each component of the central management server 16.

The central management server 16 comprises a central management server processing unit 80, a communication module 82, a user interface 84, a Web server 86, a communication application 88, a digital certificate storing memory 90, a database 92 which comprises user/password of each corporate server registered on the network 18, a database 94 comprising a relation between the Internet Protocol address of a secure bridging unit, an identification of a corporate server and a ticket, a session key generator 96, a ticket generator 97, a database 98 which comprises userID/password of each client units registered to the network 18, a database 100 comprising a relation between an identification of a corporate server and a session key of the corporate server and a database 102 which comprises userID/password for each secure bridging unit registered to the network.

In the preferred embodiment of the invention, the central management server processing unit 80 comprises a CPU of having a speed of 1 GHz or faster.

The communication module 82 comprises an Ethernet port having a speed of 100 Mb/sec and which is connected to a high-speed Internet connection.

Still in the preferred embodiment of the invention, the central management server operates under Microsoft Windows 2000.

The user interface 84 comprises a keyboard and a mouse. The Web server 86 is, in the preferred embodiment of the invention, Microsoft Internet Information Server (IIS).

Still referring to FIG. 5, the digital certificate storing memory 90 stores a digital certificate, which is unique and dedicated for the central management server 16. In the preferred embodiment of the invention, the digital certificate stored is issued by a digital certificate issuing authority such as Verisign for instance.

The database 92 which comprises userID/password of each corporate server registered to the network 18, the database 98 which comprises userID/password of each client unit of the plurality of client units registered to the network 18 and the database 102 which comprises userID/password for each secure bridging unit registered to the network, are accessed using Kerberos authentication schemes and mechanisms. Alternatively other authentication schemes and mechanisms may be used to access these databases.

The session key generator 96 generates a session key of 256 bits in the preferred embodiment of the invention.

The ticket generator 97 generates a ticket which is a 32 bits 3DES encryption key in the preferred embodiment of the invention.

Figure 6:
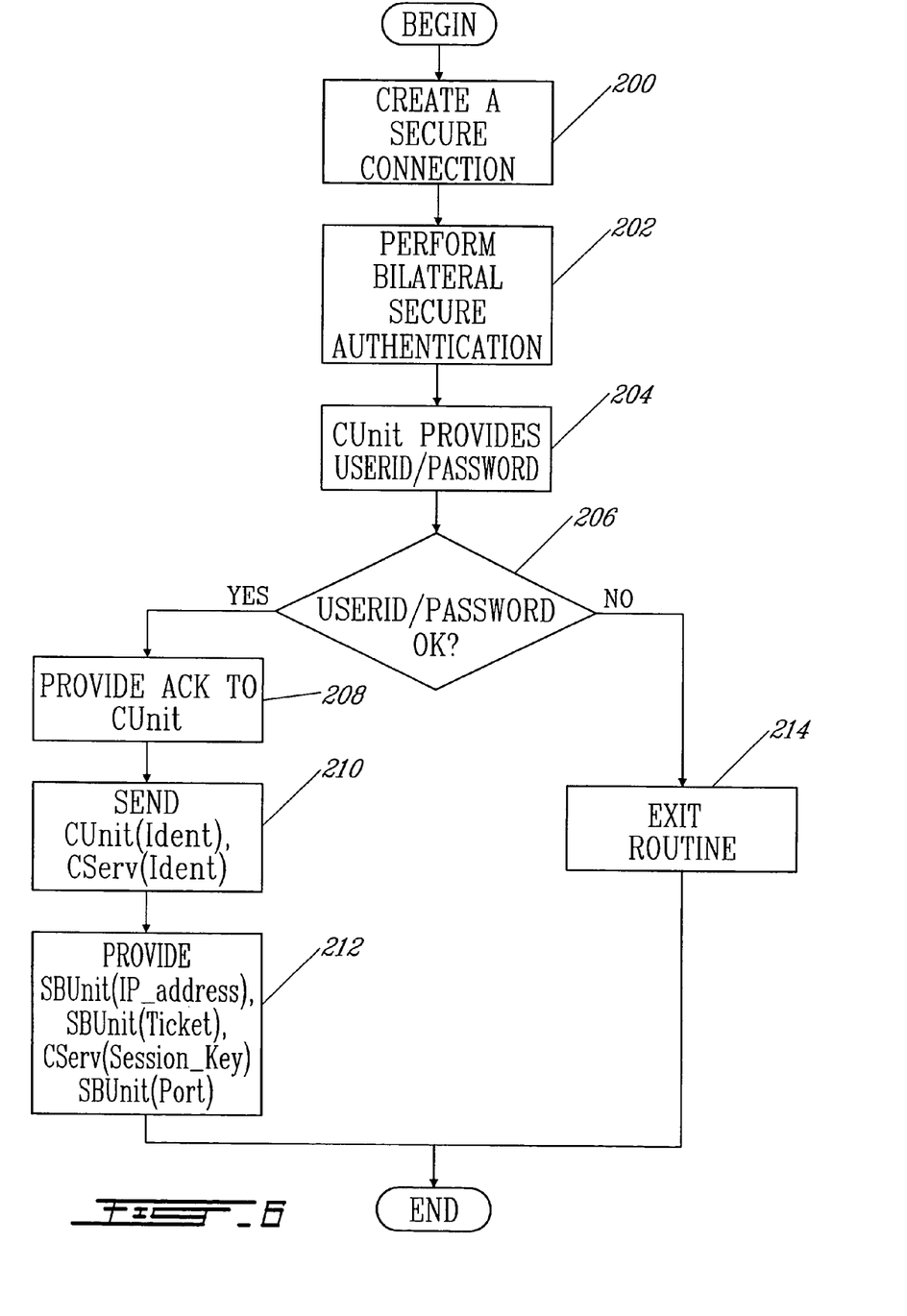
FIG. 6 is a flow chart which shows how a set-up routine is performed between one of the plurality of client units and the central management server.

Now referring to FIG. 6, there is shown how a set-up is performed between a client unit of the plurality of client units and the central management server 16 via the network 18.

According to step 200, a secure connection is established between a client unit 10 and the central management server 16. The secure connection is established using Secure Socket Layer (SSL) in the preferred embodiment of the invention. Still in the preferred embodiment, the establishment of the secure connection comprises a connection to the Web server 86 of the central management server 16.

According to step 202, a bilateral secure authentication is performed between the client unit 10 and the central management server 16. In the preferred embodiment of the invention, the bilateral secure authentication is performed by sharing a first digital certificate and a second digital certificate comprised respectively in the digital certificate storing memory 22 and in the digital certificate storing memory 90.

More precisely, the client unit 10 provides his own digital certificate comprised in the digital certificate storing memory 22 while the central management server 16 provides his own digital certificate which is comprised in the digital certificate storing memory 90.

According to step 204, the client unit 10 provides a userID and a password to the central management unit 16. The userID and the password are provided by an internal process of client unit 10. The userID and the password are provided to the central management server using the secure connection created using Secure Socket Layer (SSL).

According to step 206, the central management server 16 uses a private key to decrypt the userID and the password received. The decrypted userID and password are then provided to a Kerberos authentication mechanism and are checked against the database of userID and password comprised in the database 98.

If the decrypted userID and password do not match a userID and its respective password of the database 98, an exit routine is performed according to step 214.

According to step 208, if the decrypted userID and the password match a userID and its respective password comprised in the database 98, the central management server 16 provides an acknowledgement to the client unit 10 over the Secure Socket Layer.

According to step 210, the client unit 10 provides his own identification and an identification of a corporate server 12 to which the client unit 10 wishes to communicate. In the preferred embodiment of the invention, the two identifications are comprised respectively in the memory 30 storing the identification of the client and in the memory 28 storing the identification of the corporate server.

According to step 212, the central management server 16 retrieves an Internet Protocol address of an available secure bridging unit 14, a valid ticket and a port number of the available secure bridging unit 14 from the database 94 using the identification of the corporate server 12 provided according to step 210. The secure bridging unit selected in the database 94 is selected according to a criteria.

In one embodiment of the invention, the secure bridging unit 14 is selected depending on workload. In another embodiment of the invention, the secure bridging unit 14 is selected according to a location in the Wide Area Network 18. Someone skilled in the art will appreciate that a secure bridging unit 14 located close to the client unit 10 and to the corporate server 12 will provide a better service than a secure bridging unit 14 located far from the client unit 10 and the corporate server 12.

The Internet Protocol address of the secure bridging unit as well as the valid ticket and the port number are used by the client unit to communicate ultimately with the corporate server. This therefore avoids any direct communication between the client unit and the corporate server 42.

Furthermore and still according to step 212, a session key for the corporate server 12 is retrieved from the database 100 which comprises a relation between the identification of the corporate server and the session key of a corporate server. The Internet Protocol address of the secure bridging unit 14, the ticket of the secure bridging unit 14, the port number of the secure bridging unit 14 and the session key of the corporate server 12 are sent to the client unit 10 over the Secure Socket Layer connection.

The client unit stores the Internet Protocol address of the secure bridging unit 14, the ticket of the secure bridging unit 14 and the port number of the bridging unit 14 in the memory 26.

At this point, the client unit 10 is able to communicate with the selected corporate server using the secure bridging unit 14 characterized by the IP address, a ticket and the port number.

It will be appreciated by someone skilled in the art that the client unit 10 cannot access directly the corporate server 12 to which it wishes to communicate. With respect to the corporate server, the client unit only has an identification of the corporate server 12 and the session key of the corporate server 12.

Figure 7:
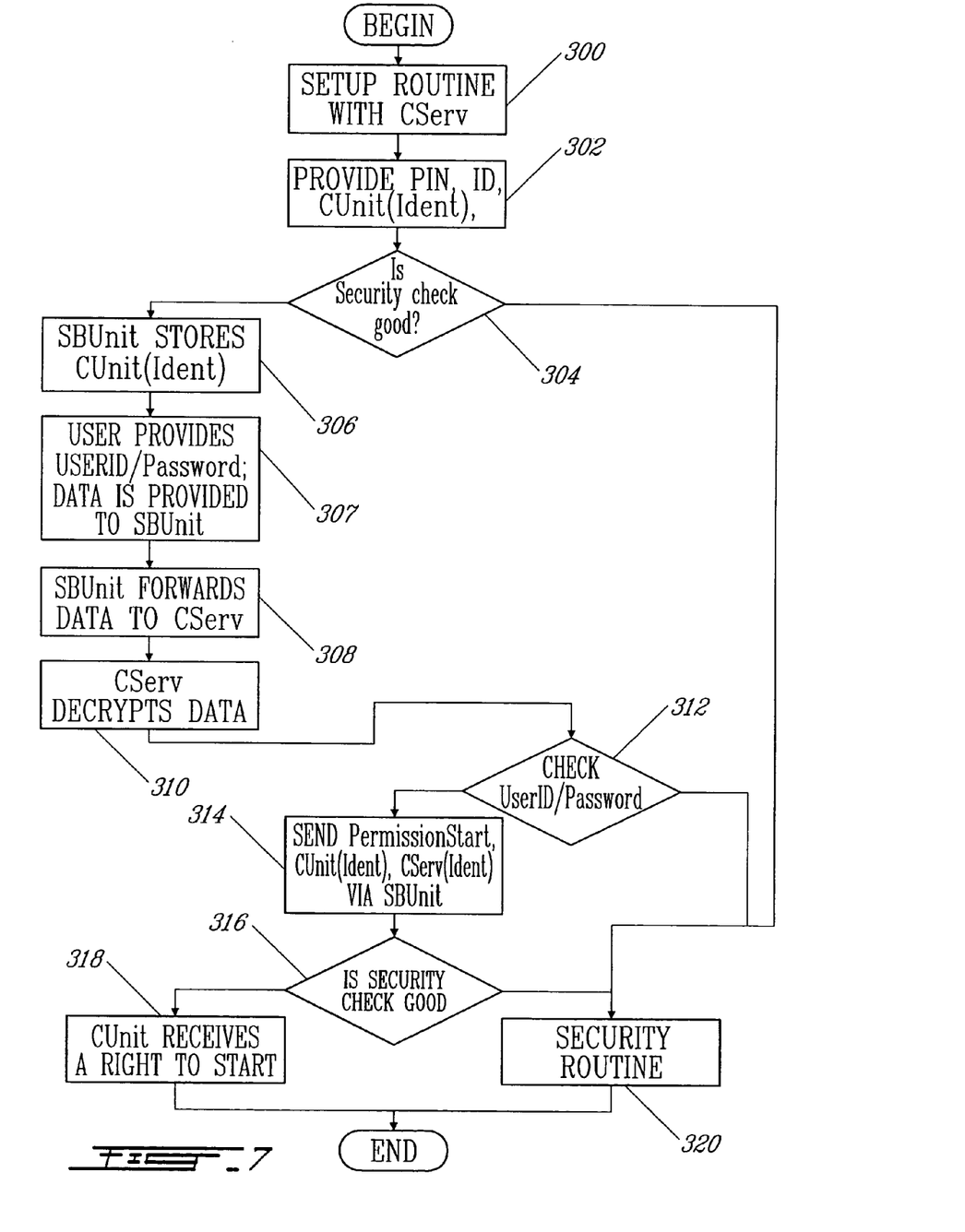
FIG. 7 is a flow chart which shows how a client unit connects to the central management server.

Now referring to FIG. 7, there is shown how a client unit 10 communicates with a corporate server 12. According to step 300, a set-up routine is performed with the central management server 16. This set-up routine is described in FIG. 6 and explained above.

Still referring to FIG. 7 and according to step 302, the client unit 10 setups a secure connection with a secure bridging unit 14. The secure connection is setup using the IP address of the secure bridging unit 14, the ticket of the secure bridging unit 14 and the port number of the bridging unit 14, which are stored in the memory 26.

The setup of the secure connection between the client unit 10 and the secure bridging unit 14 further comprises the providing to the secure bridging unit of the identification of the client unit 10 comprised in the memory 30 storing the identification of the client unit. In the preferred embodiment of the invention, the identification of the client sent is encrypted using the ticket of the secure bridging unit.

According to step 304, the secure bridging unit 14 performs a security check. The security check is performed using the ticket provided by the secure bridging unit 14 with one comprised in the secure bridging ticket storing memory 66.

If the security check fails, and according to step 320, a security routine is performed.

According to step 306, the secure bridging unit 14 stores the identification of the client unit in the database 68.

According to step 307, a user of the client unit provides a userID and a password using the user interface module 32. Still according to step 307, the client unit provides, to the secure bridging unit, the userID, the password, the identification of the client unit and the identification of the corporate server to which the client unit wishes to communicate.

According to step 308, at least one part of data transmitted according to step 307 is transmitted to the corporate server to which the client unit wishes to communicate. The at least one part of data is transmitted via the secure bridging unit.

According to step 310, the corporate server decrypts the at least one part of data transmitted according to step 308 using first the secure bridging unit ticket comprised in memory 46 and then using a session key comprised in the memory 48 storing the corporate server session key.

According to step 312, the userID and the password are checked against the database 49 comprising userID and password of a plurality of client units. In the preferred embodiment of the invention, a Kerberos authentication mechanism is used to check the userID and the password.

If the authentication fails, and according to step 320, a security routine is performed.

If the authentication succeeds and according to step 314, a permission to start, the user client identification and the corporate server identification are sent to the client via the secure bridging unit. In the preferred embodiment of the invention, the data sent is encrypted using a session key comprised in the corporate server session key storing memory 48 and then using the secure bridging unit ticket comprised in memory 46.

Still referring to FIG. 7 and according to step 316, a security check is performed by the secure bridging unit which receives the data. In the preferred embodiment of the invention, the secure bridging unit checks if the secure bridging unit ticket used to encrypt the data matches a secure bridging ticket comprised in the secure bridging unit ticket memory 66. The secure bridging unit further checks if a live connection linked to a corporate service identification exits using database 68.

If the security check performed by the secure bridging unit is successful and according to step 318, the data sent to the secure bridging unit is sent to the client unit. Still in the preferred embodiment of the invention, the data is sent encrypted using the session key of the corporate server and then using the secure bridging unit ticket. It will be appreciated that the client unit is able to decrypt the data using the secure bridging unit ticket comprised in memory 28 and the corporate server session key comprised in memory 24.

Upon receiving of the data, the client unit will be able to communicate with the corporate server 12 via the secure bridging unit 14.

Figure 8:
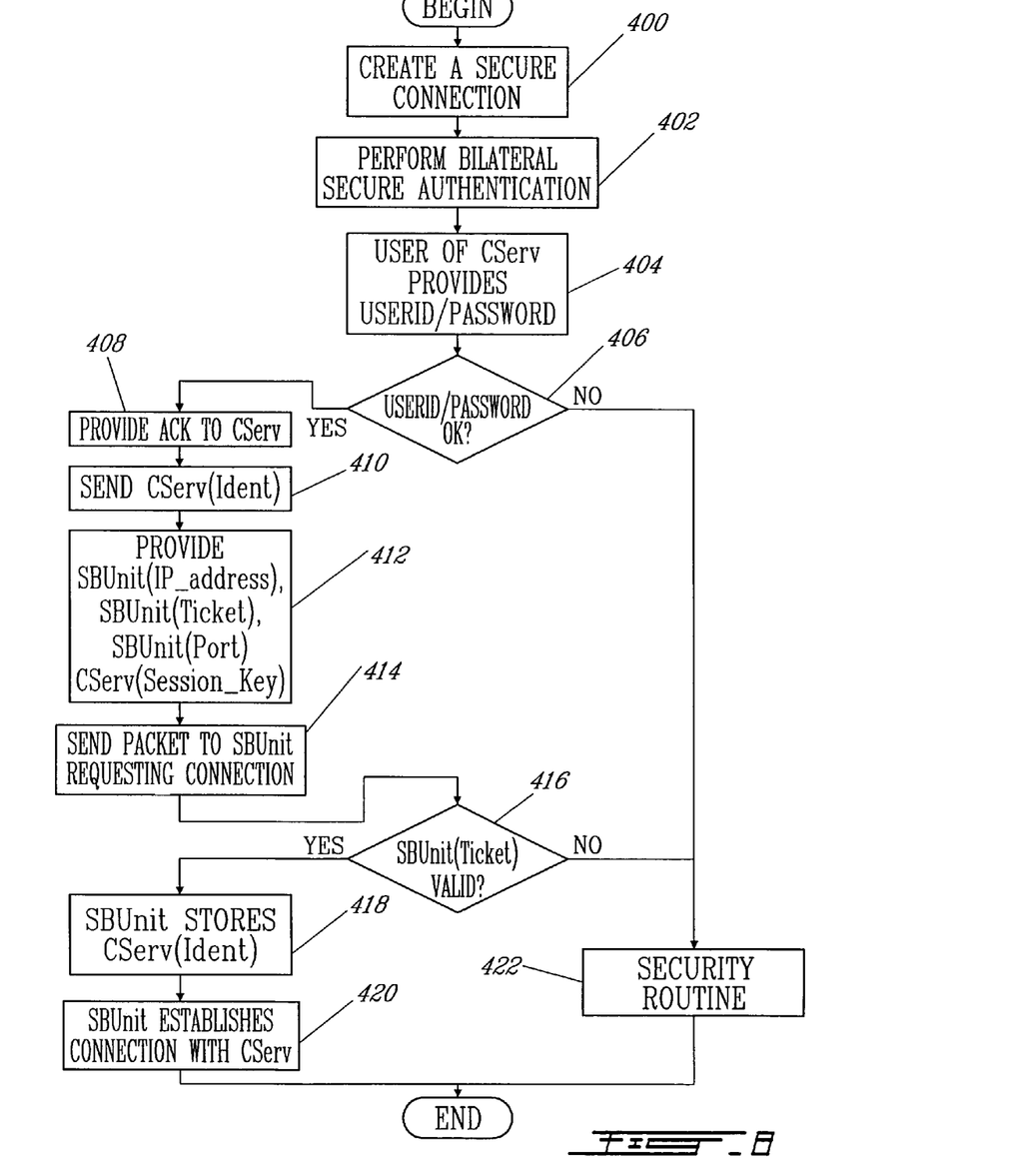
FIG. 8 is a flow chart which shows how the corporate server connects to the secure bridging unit.

Now referring to FIG. 8, there is shown how a corporate server registers with a secure bridging unit.

According to step 400, a secure connection is established between the corporate server 12 and the central management server 16. In the preferred embodiment of the invention, the secure connection is established using Secure Socket Layer (SSL) protocol.

According to step 402, a bilateral secure authentication is performed between the corporate server 12 and the central management server 16. The bilateral secure authentication is performed using a corporate server digital certificate stored in the digital certificate storing memory 44 and a central management digital certificate stored in the memory storing certificate 90.

According to step 404, an internal process of the corporate server provides a userID and password to the central management server 16. In the preferred embodiment of the invention, the userID and the password are encrypted and sent using the SSL connection established according to step 400.

According to step 406, the userID and the password provided by an internal process of the corporate server to the central management server 16 are decrypted using a private key of the central management server 16 and are checked using an authentication mechanism with the database of userID/password of the corporate server 92.

In the preferred embodiment of the invention the authentication mechanism is Kerberos.

If the userID and the password provided by the corporate server do not match a userID and its corresponding password comprised database 92, a security routine is performed according to step 422.

If the userID and the password provided by the user of the corporate server 12 to the central management server 16 matches a userID and its related password of the database 92, and according to step 408, an acknowledgement is provided to the corporate server.

According to step 410, the corporate server 12 provides its identification which is located in the memory 15 storing the corporate server identification. This identification is provided to the central management server 16.

According to step 412, the central management server 16 provides, to the corporate server 12, the Internet Protocol address of an available secure bridging unit 14 available, a corresponding port number of the available secure bridging unit 14 and a corresponding valid ticket of the available secure bridging unit 14. The IP address of the available secure bridging unit 14, the port number of the available secure bridging unit 14 and the ticket of the available secure bridging unit 14 are retrieved from the database 94.

Still referring to step 412, the central management server 16 generates a session key using the session key generator 96. The generated session key is sent to the corporate server 12 over an SSL connection. The generated session key is also stored in the database 100.

According to step 414, the corporate server 12 sends a packet to the available secure bridging unit 14 using the Internet Protocol address of the available secure bridging unit 14 and the corresponding port number of the available secure bridging unit 14. The packet is encrypted using at least the valid ticket of the available secure bridging unit 14.

The packet comprises the identification of the corporate server and a request for a connection.

According to step 416, the secure bridging unit 14 checks if the ticket provided by the corporate server 12 is valid by comparing the ticket with one currently in use and stored in the secure bridging unit storing memory 66.

If the ticket is valid, and according to step 418, the secure bridging unit stores the identification of the corporate server 12 in the database 68.

According to step 420, the secure bridging unit 14 establishes a connection with a corporate server. For each subsequent connection, the corporate server uses the corporate server session key and the secure bridging unit ticket.

Figure 9:
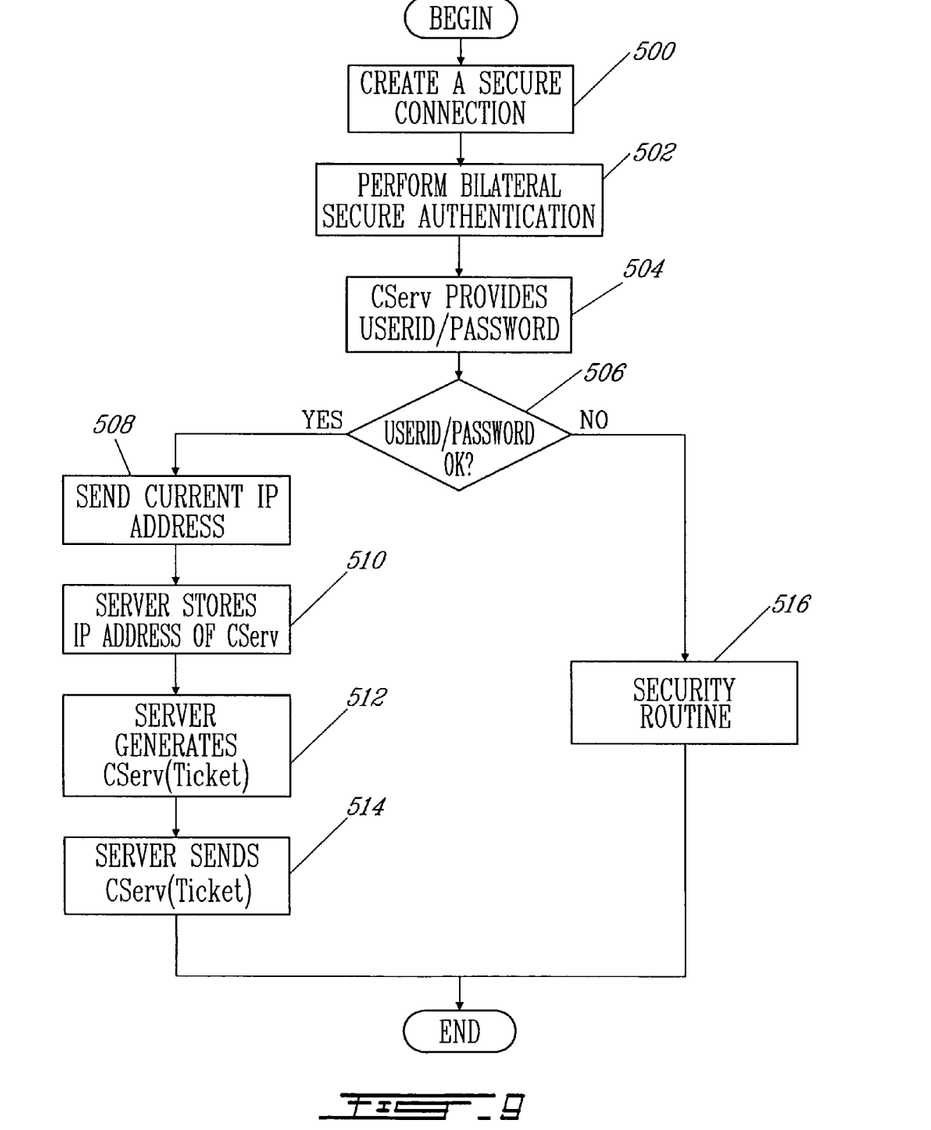
FIG. 9 is a flow chart which shows how the secure bridging unit connects to the central management server.

Now referring to FIG. 9, there is shown a flow chart which shows how the secure bridging unit 14 connects to the central management server 16.

According to step 500, a secure connection is established between the secure bridging 14 and the central management server 16. In the preferred embodiment of the invention, the secure connection is established using secure socket layer (SSL).

According to step 502, a bilateral secure authentication is performed between the secure bridging unit 14 and the central management server 16; the bilateral secure authentication is performed using a digital certificate originating from the central management server digital certificate storing memory 90 and using a digital certificate originating from the digital certificate storing memory 64 of the secure bridging unit 14.

According to step 504, a user of the secure bridging unit 14 provides a userID and a password to the central management server using the user interface 72. In the preferred embodiment of the invention, the userID and the password provided by the secure bridging unit to the central management server are encrypted and sent using the SSL connection.

According to step 506, the central management server 16 decrypts the userID and the password provided by the secure bridging unit and checks the userID and the password in a database 102 comprising userID and password of at least one secure bridging unit.

If the userID and the password provided by the secure bridging unit 14 to the central management server 16 are not located in the database 102 comprising userID and password of at least one secure bridging unit, a security routine is performed according to step 516.

If the userID and the password provided by the secure bridging unit 14 to the central management server 16 are already located in the database 102, and according to step 508, the secure bridging unit 14 sends, to the central management server 16, its current Internet Protocol address and its port number which are comprised in the memory 70.

According to step 510, the central management server 16 stores the received Internet Protocol address and the port number in the database 94.

According to step 512, the central management server 16 creates a ticket for the secure bridging unit 14 using the ticket generator 97. The ticket created for the secure bridging unit 14 using the ticket generator 97 is stored in database 94.

According to step 514, the ticket issued by the central management server 16 is provided to the secure bridging unit using the Secure Socket Layer connection. The ticket provided is stored in the memory storing ticket 56.

It will be appreciated by someone skilled in the art that such system disclosed enables the controlling of the sharing of data between at least one client and a server.

In the preferred embodiment of the invention, volatile memory is used in order to be able to randomly erase content of the volatile memory. The erasing of the volatile memory enables the re-generation of all tickets and session keys, which provides an enhanced security level.

Embodiment of the Invention for Management of a Plurality of Parking Lots

A parking lot company having a plurality of parking lots may register with a central management server in order to have a dedicated corporate server 12 which would be, in this embodiment, dedicated to the managing of the plurality of parking lots.

Upon registration, the parking lot company would receive a plurality of client units, each dedicated for managing a parking lot of the plurality of parking lots.

In the preferred embodiment of the invention, a single userID and a password may be provided to the parking lot company in order to register a new client unit dedicated to a new parking lot. The central management server comprises therefore in this embodiment a database which comprises the userID and the password. The userID and the password may also be used to remove or update a client unit.

The parking lot company would then be entitled to share information between each client unit of the plurality of client units and the dedicated corporate server 12.

The information shared may comprise availability information, space availability, accounting information, etc.

It will be appreciated by someone skilled in the art that this invention enables the managing of the parking lots in a secure way as each client unit does not know where the corporate server is located.

Furthermore the central management server 16 may implement various billing strategies, for the parking lot company, with respect to the use of the system. An invoice may be sent to the parking lot company according to one of the various billing strategies selected.

In one embodiment of the invention, the central management server keeps track of each communication between each client unit of the plurality of client units and the dedicated corporate server in order to generate the invoice. The invoice may be generated based on a number of connection performed in one embodiment, while in another embodiment, the invoice may be generated based on an amount of data transferred between the plurality of client units and the corporate server.

The central management may keep track of each communication between each client unit and the plurality of client units at a different level depending on information needed to prepare the invoice and the billing strategy selected.

In fact, and as explained above, the central management server 16 has a control over the sharing of information between each parking lot of the plurality of parking lots and the corporate server via the secure bridging unit 14. The secure bridging unit 14 further provides an extra-level of confidence in the transmitting of information.

It will also be appreciated by someone skilled in the art that the central management server 16 may avoid a communication between each of the plurality of parking lots and the corporate server in the case that the parking lot company does not pay what is due to the central management server.

The embodiments of the invention described above are intended to be exemplary only. The scope of the invention is therefore intended to be limited solely by the scope of the appended claims.

I claim:

1. A method for managing a sharing of data between a plurality of client units and a corporate server located on a wide area network, the method comprising the steps of:

authenticating a client unit connected to said network with a central management server connected to said network, the authenticating comprising the providing of an identification of the client unit to the central management server over said wide area network;

providing from the client unit to the central management server over said wide area network an identification of a corporate server to which the client unit wishes to communicate;

providing from the central management server to the client unit an address on the network of the location of a secure bridging unit using at least the identification of the client unit, said secure bridging unit having a location on said network different from said corporate server and being available to forward traffic to said corporate server;

providing a message to communicate to the secure bridging unit from the client unit over said wide area network, said message comprising said identification of the corporate server to which said client unit wishes to communicate and data to provide to said corporate server;

if said message to communicate with the secure bridging unit is accepted by said secure bridging unit, transferring at least one part of said message to said corporate server over said wide area network;

whereby the use of the central management server and the secure bridging unit enables a control of the communication between the client unit and the corporate server.

2. The method as claimed in claim 1, further comprising the authenticating of said client unit by said corporate server.

3. The method as claimed in claim 1, wherein the authenticating of said client unit by said central management server is performed using a bilateral secure authentication.

4. The method as claimed in claim 3, wherein the bilateral secure authentication is performed using Secure Socket Layer (SSL).

5. The method as claimed in claim 1, wherein said providing from the central management server to the client unit said address on the network of the location of said secure bridging unit using at least said identification of the client unit further comprises providing, from said central management server to the client unit, a corporate server session key encrypting at least one part of said message for said corporate server.

6. The method as claimed in claim 5, wherein said providing from the central management server to the client unit said address on the network of the location of said secure bridging unit using at least said identification of the client unit further comprises providing, from said central management server to the client unit, a secure bridging encryption key for encrypting at least one part of said encrypted message to communicate to said secure bridging unit.

7. The method as claimed in claim 5 wherein said providing of said server session key is performed randomly in time and kept in volatile memory.

8. The method as claimed in claim 6, wherein said providing of said secure bridging encryption key is performed randomly in time and kept in volatile memory.

9. The method as claimed in claim 1, wherein a plurality of client units share data with a plurality of corporate servers.

10. The method as claimed in claim 1, wherein said network is a Wide Area Network (WAN).

11. The method as claimed in claim 10, wherein said Wide Area Network is Internet, further wherein the authenticating is performed by accessing a Web server.

12. The method as claimed in claim 1, wherein said secure bridging unit is chosen according to a location of a secure bridging unit with respect to said client unit and to said corporate server on said network.

13. The method as claimed in claim 1, wherein said secure bridging unit is chosen according to a workload of a secure bridging unit.

14. A method for managing a sharing of data between a plurality of parking lot units and a central management server of a party located on a wide area network, the method comprising the steps of:
 authenticating a parking lot unit connected to said network with a central management server connected to said network, the authenticating comprising the providing of an identification of the parking lot unit to the central management server over said wide area network;
 providing from the parking lot unit to the central management server an identification of a central computer to which the parking lot unit wishes to communicate;
 providing over said wide area network from the central management server to the parking lot unit an address on the network of the location of a secure bridging unit using at least said identification of the parking lot unit, said secure bridging unit having a location on said network different from said central computer and being available to forward traffic to said central computer;
 providing a message to communicate to the secure bridging unit from the parking lot unit over said wide area network, said message comprising said identification of the central computer to which said parking lot unit wishes to communicate and data to provide to said central computer;
 if said message to communicate with the secure bridging unit is accepted by said secure bridging unit, transferring at least one part of said message to said central computer over said wide area network;
 whereby the use of the central computer and the secure bridging unit enables a control of the communication between the parking lot unit and the central computer.

15. The method as claimed in claim 14, further comprising the step of storing at least one part of said message to communicate in said central management server.

16. The method as claimed in claim 15, further comprising the step of sending an invoice to said party having said central management server using said at least one part of said message stored.

17. The method as claimed in claim 14, further comprising the step of providing a new client username and a new client password to said central management server for adding a corresponding new parking lot unit to said plurality of parking lot units and receiving, from said central management server, an identification for said new parking lot unit.

18. The method as claimed in claim 17, wherein said providing of said client username and said client password is performed via a webserver.

19. The method as claimed in claim 17, further comprising the step of providing an encryption key from said central management server to said new parking lot unit.

20. The method as claimed in claim 16, wherein the step of sending an invoice to said party comprises the step of computing using the at least one part of said message stored a number of times said providing said message to communicate to the secure bridging unit from the parking lot unit is performed.

21. The method as claimed in claim 16, wherein the step of sending an invoice to said party comprises the step of computing a number indicative of an amount of data transferred using the at least one part of said message stored, and including said amount of data transferred in said invoice.

22. A system for managing sharing of data between a plurality of client units and a corporate server located on a wide area network, the system comprising:
 a plurality of client units connected to said network, each client unit comprising a client unit identifier identifying said client unit, the client unit further comprising a corporate server identifier identifying said corporate server to which said client unit intends to share said data;
 a corporate server connected to said network and comprising a corporate server identifier;
 a central management server, located on said network, comprising a list of secure bridging unit identifiers, the central management server further comprising an authentication module receiving an authentication request from a client unit for a corporate server and providing over said network, in response, to said client unit, an address on said network of a secure bridging unit according to said list of secure bridging unit identifier;
 at least one secure bridging unit having a location on said network different from said corporate server and being available to forward traffic to said corporate server over said network, said secure bridging unit comprising a store of at least one relation between a client unit identifier and a corporate server identifier, the secure bridging unit further comprising a store of an address on said network of said corporate server, the secure bridging unit being operative to receive a communication request from a client unit and forward at least one part of said communication request to said corporate server;
 wherein data shared between said corporate server and said client unit are managed using the central management server in combination with the secure bridging unit.

23. The system as claimed in claim 22, wherein the central management server comprises a list of corporate server encryption session keys, further wherein said corporate server comprises a corporate server encryption session key provided from said list of corporate server encryption session keys by said central management server.

24. The system as claimed in claim 22, wherein the central management server comprises a list of secure bridging unit encryption keys, further wherein said secure bridging unit comprises a secure bridging unit encryption key provided from said list of secure bridging unit encryption keys by said central management server.

25. The system as claimed in claim 22, wherein said authentication module operates using Secure Socket Layer (SSL) protocol.

26. The system as claimed in claim 22, wherein said at least one secure bridging unit, said plurality of client units, said corporate server are identified using a username and a password, the central management server further comprising a list of said username and said password.

27. The system as claimed in claim 22, wherein said plurality of client units are identified using a username and a password, at least one corporate server further comprises a list of said username and said password.

28. The system as claimed in claim 22, wherein Kerberos is used to authenticate.

\* \* \* \* \*